United States Patent [19]

Kurata et al.

[11] 4,147,365
[45] Apr. 3, 1979

[54] RECORD PLAYER

[75] Inventors: Junichi Kurata; Kazushige Ishikawa; Nozomu Nagashima, all of Saitama, Japan

[73] Assignee: Pioneer Electronic Corporation, Tokyo, Japan

[21] Appl. No.: 841,416

[22] Filed: Oct. 12, 1977

[30] Foreign Application Priority Data

Oct. 13, 1976 [JP] Japan ............................. 51-122555

[51] Int. Cl.² ............................................. G11B 3/06
[52] U.S. Cl. ............................. 274/9 RA; 274/23 A
[58] Field of Search ............ 274/1 R, 2, 14 R, 15 R, 274/13 R, 23 A; 312/8

[56] References Cited

U.S. PATENT DOCUMENTS

| | | | |
|---|---|---|---|
| 1,315,989 | 9/1919 | Rubin | 274/2 |
| 1,327,977 | 1/1920 | Bennington | 312/8 |
| 3,652,142 | 3/1972 | Kreutzweiser | 312/8 |
| 3,937,903 | 2/1976 | Osann | 274/15 |

*Primary Examiner*—Harry N. Haroian
*Attorney, Agent, or Firm*—Sughrue, Rothwell, Mion, Zinn and Macpeak

[57] ABSTRACT

A record player capable of being installed into a wall comprises a housing integrally attached to the record player and provided with an opening in the front thereof so that the inner portion of the record player may be seen therethrough. An illumination means comprising a light source and a light scattering plate is attached to the inner portion of the record player for purposes of illumination. The record player thus constructed is made automatically operable by a remote control means by employing a suitable tonearm position setting apparatus.

5 Claims, 3 Drawing Figures

RECORD PLAYER

BACKGROUND OF THE INVENTION

This invention relates to a record player.

Recently, there is a tendency that the interior design of a room takes into consideration a rational use of a room space. To this end some furniture, appliances and the like are being designed to be built into or installed in the wall.

SUMMARY OF THE INVENTION

In view of the above-mentioned circumstances, the present invention provides a novel record player which is facilitated in its operation even if the record player is accommodated in a wall or is surrounded with a rack, for example.

DETAILED DESCRIPTION OF THE PREFERRED EMBODIMENT

A preferred embodiment according to the present invention will now be described with reference to the accompanying drawings.

Figure 1:
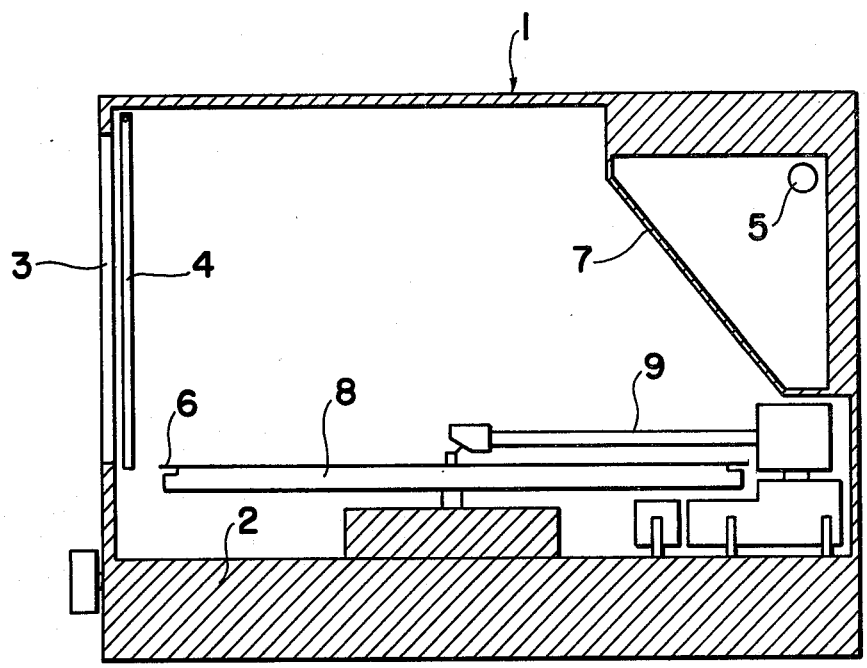
FIG. 1 shows a schematic sectional view according to the present invention.

FIG. 1 shows a schematic sectional view of the record player, in which a housing 1 and a base 2 are integrally constructed. In the front surface of the housing 1, there is provided an opening 3 behind which a door 4 is pivotally attached at the top thereof. The door 4 is made of a transparent material and opens inwardly to facilitate placing or removing a record disc on a turntable 8. Further, in the rear portion of the housing 1 obliquely above the turntable 8, there is provided an illumination means including a lamp 5 having a tubular shape and a light scattering plate 7. The light scattering plate 7 scatters or diffuses the light from the lamp 5 so as to uniformly irradiate the area including the moving path of the tonearm 9. The irradiated light is reflected in the vicinity of the tonearm and is directed to the front surface of the housing 1, whereby the internal portion of the record player is made visible.

Figure 2:
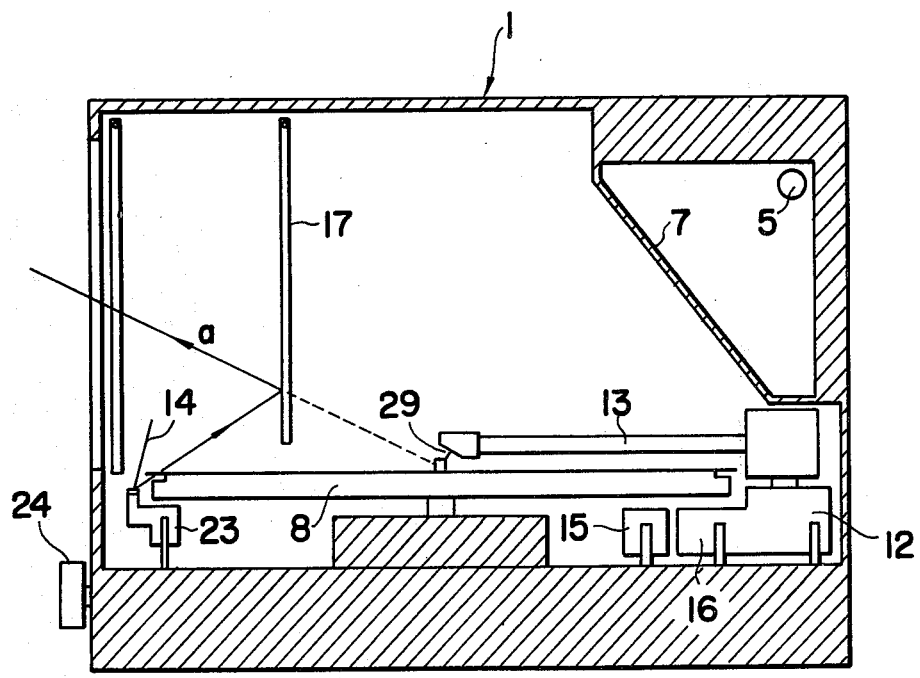
FIG. 2 shows a schematic sectional view of another embodiment according to the present invention, which employs a tonearm position setting apparatus.
Figure 3:
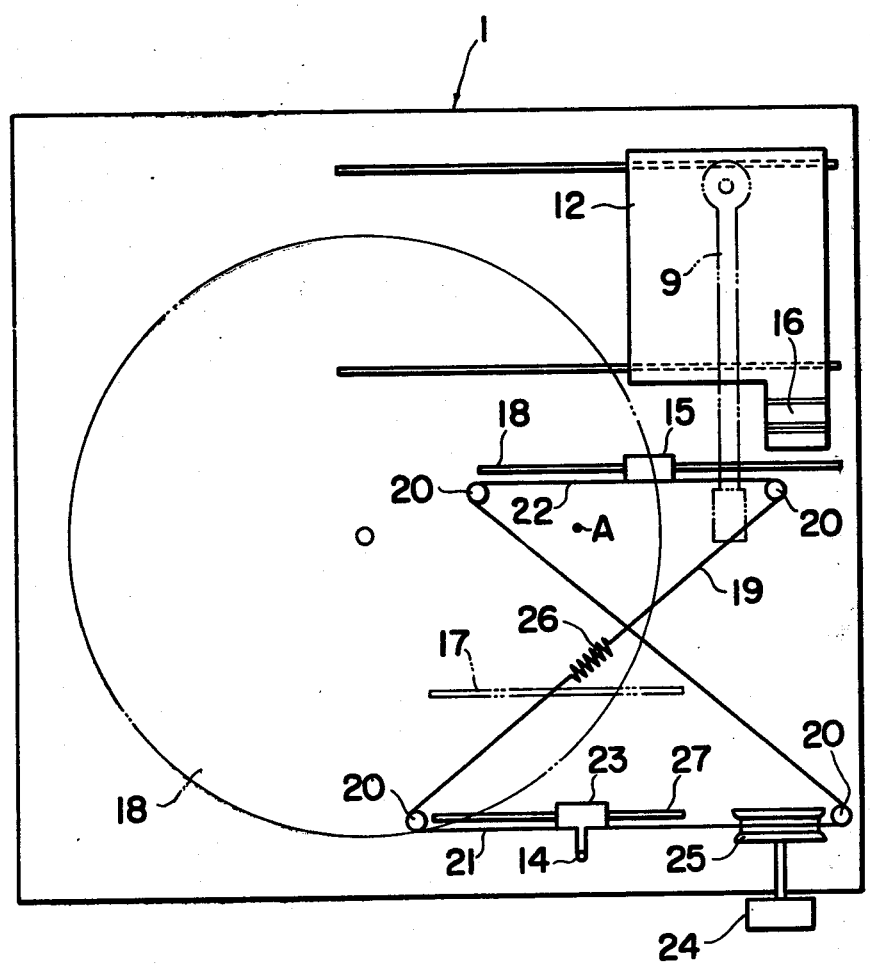
FIG. 3 shows an internal schematic view of the tonearm position setting apparatus shown in FIG. 2.

The tonearm 9 is made so as to be moved to a desired position of a record disc by a certain type of tonearm position setting mechanism, and then the record playing is commenced. The tonearm position setting apparatus suitable to the record player according to the present invention will now be described with reference to FIGS. 2 and 3.

In the rear portion of a record player 1, a tonearm base 12 is mounted to be linearly movable, and a tonearm 13 is moved in accordance with the movement of the tonearm base 12. A pick-up stylus 29 mounted at the tip end of the tonearm 13 is adapted to move along a radial direction of the record disc. This is a known linear tracking type of tonearm and is employed to eliminate tracking errors. In the front lower portion of the record player, there is mounted a light source 14, which is made movable substantially parallel to the movement direction of the tonearm base 12. A position setting means 15 is mounted near the tonearm 13 on a rail 18 and is movable substantially parallel to and in the same direction as the moving direction of the light source 14, so that the positioning relationship therebetween is maintained constant. The position setting means 15 may contain a light emitting element. In the front portion of the tonearm base 12, a position detecting means 16 is provided integral with the tonearm base 12. The position detecting means 16 may have a light receiving element responsive to the light from the light emitting element contained in the position setting means 15. A semi-transparent mirror 17 is provided approximately perpendicular to a turntable 18 in about the intermediate position of the loci of the light source 14 and the stylus 29.

A wire loop 19 passes around at least four idler pulleys in cross-fashion. A spring 26 constituting a part of the wire loop gives tension to the wire 19. The non-crossed wire segments 21 and 22 are substantially parallel to each other, and are also substantially parallel to the moving direction of the light source 14 and the position setting means 15. A light source moving stand 23 and the position setting means 15 are attached to the wire segments 21 and 22, respectively, wherein the light source moving stand 23 and the position setting means 15 are both adapted to be moved at least the distance of the radius of the record disc. Further, the light source moving stand 23 and the position setting means 15 are adapted to move in the same direction and the same distance. A knob 24 is provided in the front surface of the record player 1, and roller means 25 is coaxially connected thereto. The wire 19 is wrapped at least one time around the circumference of the roller means 25 so that the wire 19 may be moved in accordance with the turning of the knob 14.

With the above-mentioned construction, the operation will next be described. Viewed from the front of the record player 1, the tonearm base 12 is positioned to the right, when the player 1 is in the stopped condition. Also, the position detecting means 16 is positioned to the right with the tonearm base 12.

To commence the playing of a record disc from the stopped condition, it is firstly necessary to preset the playing position of the disc. The knob 24 is turned to cause the wire 19 to travel by the roller means 25 connected thereto, and the light source moving stand 23 and the position setting means 15 start travelling along the rails 27 and the 28, respectively, in accordance with the wire movement. On the other hand, the light emitted from the light source 14 is reflected in the semi-transparent mirror 17 (see the arrow-line a in FIG. 2); therefore, the virtual image of the light source 14 is to be seen in the symmetrical position with reference to the mirror 17 (see the mark A in FIG. 3). The knob 14 is turned so that the virtual image is coincident with the desired playing commencement position of the disc. Upon the completion of the above-described operation, a switch (not shown) is turned on to cause the tonearm base 12 to move leftwardly and the position detecting means 16 moved in accordance therewith. The tonearm base 12 is stopped in the desired playing commencement position when the light receiving element contained in the position detecting means 16 detects the light emitted from the light emitting means contained in the position setting means 15. As soon as the tonearm base 12 stops, the tonearm 13 is automatically lowered onto the record and the record player begins to play.

When the above-described tonearm position setting apparatus is employed to the record player according to the present invention, the moving position of the tonearm or the desired position where the tonearm is intended to be moved will be easily verified due to the fact that the illumination means illuminates the record disc placed behind the semi-transparent mirror.

As described hereinbefore, the present invention provides a record player having an opening in the front surface of the housing, in which the playing commencement position of the record disc is set by an automatic remote control operation, whereby the operation of the record player is facilitated even though the record player is buried into the wall or surrounded in its periphery with a rack or the like. The present invention provides further advantages in that the room space is rationally utilized and the invasion of dust into the record player will be prevented.

What is claimed is:

1. A record player capable of automatically setting a player commencement position of a tonearm on a record disc by a remote control operaton, said player including a movable tonearm having a pick-up stylus mounted at one end thereof, the improvement comprising:
   housing means integrally attached to the record player;
   viewing means in a front surface of said housing means through which the record player may be observed;
   position control means for controlling the commencement position of said tonearm on said record disc, said position control means including a light source movable in a direction substantially parallel to the movement direction of said stylus for indicating a set commencement position; and
   a semi-transparent mirror disposed within said housing at a position between said light source and said tonearm, the position of said tonearm and said set commencement position as indicated by the virtual image of said light source in said mirror being simultaneously viewable through said viewing means.

2. A record player as claimed in claim 1, wherein said viewing means comprises an opening in the front surface of said housing means and a door means made of a transparent material for opening or closing said opening.

3. A record player as claimed in claim 2, wherein said door means is inwardly movable within said housing means.

4. A record player as claimed in claim 1, wherein an illumination means for illuminating the moving path of said tonearm is mounted in the rear portion of said housing means and obliquely above said turntable.

5. A record player as claimed in claim 4, wherein said illumination means comprises a light source and a light scattering plate for scattering the light from said light source.

* * * * *